US008478507B2

(12) United States Patent
Sata

(10) Patent No.: US 8,478,507 B2
(45) Date of Patent: Jul. 2, 2013

(54) CONTROL DEVICE FOR INTERNAL COMBUSTION ENGINE

(75) Inventor: Kota Sata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/257,871

(22) PCT Filed: Apr. 21, 2010

(86) PCT No.: PCT/JP2010/057077

§ 371 (c)(1), (2), (4) Date: Sep. 20, 2011

(87) PCT Pub. No.: WO2011/132277

PCT Pub. Date: Oct. 27, 2011

(65) Prior Publication Data

US 2013/0054110 A1 Feb. 28, 2013

(51) Int. Cl.

*G06F 19/00* (2006.01)
*G06F 17/00* (2006.01)
*G06G 7/70* (2006.01)
*G06G 7/00* (2006.01)
*G05D 1/00* (2006.01)

(52) U.S. Cl.

USPC ........... 701/102; 701/101; 701/103; 701/115; 706/14; 706/13; 706/26; 706/25; 706/45

(58) Field of Classification Search

USPC ................. 701/101, 102, 103, 104, 105, 106, 701/114, 115; 706/14, 26, 31, 25, 13, 45

See application file for complete search history.

(56) References Cited

U.S. PATENT DOCUMENTS

| | | | | |
|---|---|---|---|---|
| 5,794,171 | A * | 8/1998 | Bryant et al. | 701/99 |
| 6,021,369 | A * | 2/2000 | Kamihira et al. | 701/102 |
| 6,151,548 | A * | 11/2000 | Kamihira et al. | 701/102 |
| 6,278,986 | B1 * | 8/2001 | Kamihira et al. | 706/25 |
| 6,336,070 | B1 * | 1/2002 | Lorenz et al. | 701/102 |
| 6,415,272 | B1 * | 7/2002 | Ulyanov | 706/2 |
| 7,065,960 | B2 * | 6/2006 | Gioannini et al. | 60/295 |

(Continued)

FOREIGN PATENT DOCUMENTS

| | | |
|---|---|---|
| JP | A-2005-133714 | 5/2005 |
| JP | A-2005-199951 | 7/2005 |

(Continued)

OTHER PUBLICATIONS

International Search Report mailed Jun. 8, 2010 issued in International Patent Application No. PCT/JP2010/057077 (with translation).

*Primary Examiner* — Stephen K Cronin
*Assistant Examiner* — Raza Najmuddin
(74) *Attorney, Agent, or Firm* — Oliff & Berridge, PLC

(57) ABSTRACT

A control device used for an internal combustion engine and capable of determining an actuator operation amount is provided. The control device includes a computation element that uses engine status amounts to compute the actuator operation amount. The computation element uses a model that includes a plurality of submodels arranged in a hierarchical sequence. The computation element computes the actuator operation amount by using a parameter calculated by the lowest level submodel and changes the number of higher-level submodels to be used in combination with the lowest level submodel in accordance with the operation status of the internal combustion engine.

8 Claims, 5 Drawing Sheets

U.S. PATENT DOCUMENTS

| | | | | |
|---|---|---|---|---|
| 8,209,159 | B2 * | 6/2012 | Bensch et al. | 703/8 |
| 2005/0137776 | A1 * | 6/2005 | Gioannini et al. | 701/101 |
| 2008/0097683 | A1 * | 4/2008 | Yasui et al. | 701/104 |
| 2008/0126044 | A1 | 5/2008 | Degaki | |
| 2010/0088005 | A1 * | 4/2010 | Sakayanagi | 701/102 |
| 2011/0172897 | A1 * | 7/2011 | Tsuzuki et al. | 701/103 |

FOREIGN PATENT DOCUMENTS

| | | |
|---|---|---|
| JP | A-2007-293707 | 11/2007 |
| JP | A-2008-133767 | 6/2008 |
| JP | A-2008-144680 | 6/2008 |
| JP | A-2009-47102 | 3/2009 |
| JP | A-2009-299509 | 12/2009 |

* cited by examiner

CONTROL DEVICE FOR INTERNAL COMBUSTION ENGINE

TECHNICAL FIELD

The present invention relates to a control device that operates one or more actuators to control an operation of an internal combustion engine, and more particularly to a control device that uses a model during a process for computing an actuator operation amount from an engine status amount.

BACKGROUND ART

It is demanded that an automotive internal combustion engine (hereinafter referred to as the engine) exhibit, for instance, satisfactory driveability, emissions performance, and fuel consumption rate. A control device for the engine controls the engine by operating various actuators to meet such demands. When computing an actuator operation amount, the control device uses various models that are obtained by modeling the functions and characteristics of the engine. The models include a physical model, a statistical model, a combination of these models, and various other models. For example, an air model is used as a model for engine control. The air model is obtained by modeling the response characteristics of an intake air amount with respect to a throttle operation. Further, various maps, such as an ignition timing map for ignition timing determination, and a group of maps may also be used for engine control. In addition to such element-level models, a large-scale model obtained by modeling the entire engine may also be used by the control device described, for instance, in JP-A-2009-47102.

Obviously, the higher the accuracy of a model used for computation, the higher the accuracy of actuator operation amount determination. However, on the other side of the coin, the higher the accuracy of the model, the higher the load imposed on computation based on the model. Although the computation capability of the control device has been enhanced year after year, there is a limit to computation capability enhancement. Therefore, from the viewpoint of computational load, models exhibiting very high accuracy are not always applicable to conventional control devices. Especially when the employed model performs computation at each predetermined crank angle, the computational load varies with the engine speed. That is why the details of the model have to be determined with respect to a high engine speed region in which the computational load is high. In other words, it is difficult for the conventional control devices to use highly accurate models from the viewpoint of computational load within the high engine speed region although the computational load is adequately low within a low engine speed region, which is frequently used under normal conditions.

SUMMARY OF INVENTION

An object of the present invention is to determine an actuator operation amount with high accuracy by making the most of the computation capability of the control device. In order to achieve the object, the present invention provides the following control device for an internal combustion engine.

According to one aspect of the present invention, there is provided a control device that includes a computation element for computing an operation amount of an actuator by using an engine status amount measured by a sensor. The computation element uses a model during its computation process. The model includes a plurality of submodels that are arranged in a hierarchical sequence. Each submodel may be a physical model, a statistical model, or a combination of these models. When parameters are calculated by two consecutive submodels arranged in the hierarchical sequence, there is a means-end relation between a parameter calculated by a lower-level submodel and a parameter calculated by a higher-level submodel. The highest level submodel calculates a parameter that is a numerical value representing a request concerning internal combustion engine performance, and is built so as to calculate the parameter by using an engine status amount. Submodels other than the highest level submodel are built so that when an immediately higher-level submodel is used, a parameter calculated by the higher-level submodel is handled as a target value to calculate a parameter for achieving the target value from an engine status amount. When, on the other hand, the immediately higher-level submodel is not used, the parameter is calculated from an engine status amount only. The computation element can calculate the actuator operation amount by using a parameter calculated by the lowest level submodel and change the number of higher-level submodels to be used in combination with the lowest level submodel in accordance with internal combustion engine operation status.

According to the control device configured as described above, the number of higher-level submodels to be used in combination with the lowest level submodel can be changed to arbitrarily adjust the balance between model accuracy and computational load. For example, using only the lowest level submodel as a model makes it possible to minimize the computational load on the control device. When the lowest level submodel used in combination with an immediately higher-level submodel, the model accuracy increases although the computational load increases. The number of higher-level submodels to be combined can be increased in the hierarchical sequence to further enhance the model accuracy. When the lowest level submodel is combined with all the higher-level submodels including the highest level submodel, the model accuracy is maximized to determine the actuator operation amount with highest accuracy. According to the control device described above, the selection of the above-mentioned combination can be made in accordance with the engine speed or other internal combustion engine operation status to make the most of the computation capability of the control device.

In the above-described aspect, the computation element can store a load index value, which serves as a computational load index, for each submodel and for each internal combustion engine operation state. Further, the hierarchical level of a high-level submodel used in combination with the lowest level submodel can be raised within a range within which a reference value is not exceeded by an integrated value of the load index value. This makes it possible to always make the fullest possible use of the computation capability of the control device. In addition, the computation element can exercise feedback control so that the computational load is measured in real time and reflected in the combination of submodels.

In the above-described aspect, the computation element may include a plurality of differently structured models in order to respectively compute different actuator operation amounts. In such an instance, the plurality of models are prioritized. The computation element can raise the hierarchical level of the higher-level submodel to be used in combination with the lowest level submodel, in order from the highest priority model to the lowest, within a range within which the reference value is not exceeded by the integrated value of the load index value. This ensures that the computation capability of the control device is preferentially allocated to the computation of a high priority model. Consequently, it is possible to make effective use of the computation capability of the control device.

The priorities of the plurality of models can be changed in accordance with internal combustion engine operation status. This ensures that the computation capability of the control device is allocated to the computation of the currently highest priority model. Consequently, the computation capability of the control device can be more effectively used.

According to another aspect of the present invention, there is provided a control device that includes a computation element for computing an operation amount of an actuator by using an engine status amount measured by a sensor. The computation element uses a model during its computation process. The computation element has a model group, which includes a plurality of models differing in scale for computing the same actuator operation amount. The plurality of models are arranged in a sequence according to scale. The larger-scale one of two consecutive models arranged in the sequence includes a low-level submodel, which corresponds to the smaller-scale model, and a high-level submodel, which is coupled to the low-level submodel. The low-level submodel is built so as to use a parameter calculated by the high-level submodel as a target value and calculate a parameter for achieving the target value from an engine status amount. The computation element selects a model for use in the computation of an actuator operation amount from the model group in accordance with internal combustion engine operation status. The computation element then computes the actuator operation amount by using a parameter calculated by the selected model.

According to the control device configured as described above, the scale of the model to be selected can be varied to arbitrarily adjust the balance between model accuracy and computational load. For example, selecting the smallest-scale model makes it possible to minimize the computational load on the control device. When the selected model is larger in scale than the smallest-scale model within the sequence but closest in scale to the smallest-scale model, a low-level submodel (that is, the smallest-scale model) performs computation by using a parameter calculated by an included high-level submodel as a target value. In this instance, the overall model accuracy increases although the computational load on the control device increases. Similarly, selecting a larger-scale model within the sequence makes it possible to increase the overall model accuracy. When the largest-scale model is selected, the overall model accuracy is maximized so that the actuator operation amount can be determined with the highest accuracy. According to the control device described above, it is possible to make the most of the computation capability of the control device when the above-described model selection is made in accordance with internal combustion engine operation status such as the engine speed.

In the above-described aspect, the computation element can store a load index value, which serves as a computational load index, for each model and for each internal combustion engine operation state. Further, a model can be selected from a group of models so that the load index value becomes maximized without exceeding a reference value. This makes it possible to always make the fullest possible use of the computation capability of the control device.

In the above-described aspect, the computation element may include a plurality of model groups in order to respectively compute different actuator operation amounts. In such an instance, the plurality of model groups are prioritized. The computation element can enlarge the scale of the model to be used for actuator operation amount computation, in order from the highest priority model group to the lowest, within a range within which the load index value does not exceed the reference value. This ensures that the computation capability of the control device is preferentially allocated to the computation of a group of high priority models. Consequently, it is possible to make effective use of the computation capability of the control device.

The priorities of the plurality of model groups can be changed in accordance with internal combustion engine operation status. This ensures that the computation capability of the control device is allocated to the computation of a group of the currently highest priority models. Consequently, the computation capability of the control device can be more effectively used.

BEST MODE FOR CARRYING OUT THE INVENTION

First Embodiment

A first embodiment of the present invention will now be described with reference to the accompanying drawings.

A control device according to the first embodiment of the present invention is applied to an automotive internal combustion engine (hereinafter referred to as the engine). The types of engines to which the control device is applicable are not limited. The control device is applicable to various types of engines such as a spark-ignition engine, a compression-ignition engine, a four-stroke engine, a two-stroke engine, a reciprocating engine, a rotary engine, a single cylinder engine, and a multiple cylinder engine. The control device controls engine operations by operating one or more actuators (e.g., a throttle, an ignition device, and a fuel injection valve) included in the engine.

The control device is capable of computing each actuator operation amount in accordance with engine status amounts derived from various sensors mounted in the engine. The engine status amounts include, for instance, an engine speed, an intake air amount, an air-fuel ratio, an intake pipe pressure, an in-cylinder pressure, an exhaust temperature, a water temperature, and an oil temperature. A computation element of the control device uses models during an actuator operation amount computation process. The models are obtained by modeling the functions and characteristics of the engine. The models include a physical model, a statistical model, a combination of these models, and various other models. Further, the models include not only an overall model, which is obtained by modeling the entire engine, but also a partial model, which is obtained by modeling a function of the engine. Furthermore, the models include not only a forward model, which is obtained by modeling the functions and characteristics of the engine in a forward direction with respect to a cause-and-effect relationship, but also an inverse model, which is an inverse of the forward model.

Figure 1:
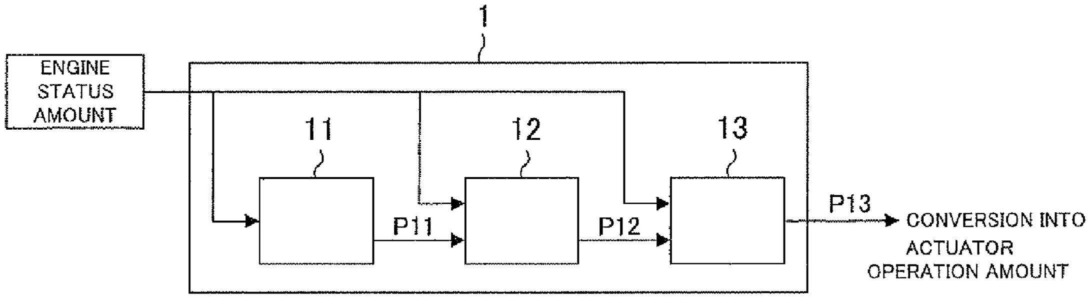
FIG. 1 is a diagram illustrating a model structure for a first embodiment of the present invention.

A model structure used for actuator operation amount calculation by the control device is one of the features provided by the present embodiment. FIG. 1 is a block diagram illustrating the model structure for the first embodiment. As shown in FIG. 1, a model 1 used in the present embodiment is structured so that a plurality of submodels 11, 12, 13 are hierarchically coupled. The submodel 11 is at the highest hierarchical level, whereas the submodel 13 is at the lowest hierarchical level. A parameter calculated by the lowest level submodel 13 (a parameter P13 shown in FIG. 1) is a parameter that is finally output from the model 1. The control device uses the parameter P13 for actuator operation amount computation.

Various engine status amounts acquired by the sensors are input into the model 1. The input engine status amounts are used for parameter calculation in each submodel. Each submodel is obtained by modeling the functions and characteristics of the engine. The parameter calculated by each submodel is related to an engine control amount. The calculated parameter varies from one submodel, to another. More specifically, as regards two consecutive submodels arranged in a sequence, there is a means-end relation between a parameter calculated by the lower-level submodel and a parameter calculated by the higher-level submodel.

For example, a parameter P11 calculated by the highest level submodel 11 is an end for a parameter P12 calculated by a lower-level submodel 12. In other words, the parameter P12 is a means for achieving the parameter P11. The submodel 12 uses the value of the parameter P11 as a target value and calculates the value of the parameter P12 for achieving the target value from various engine status amounts. Similarly, the submodel 13 uses the value of the parameter P12 as a target value and calculates the value of the parameter P13 for achieving the target value from various engine status amounts.

The highest level submodel 11 calculates the value of the parameter P11 merely from the engine status amounts. The parameter P11 calculated by the highest level submodel 11 represents a final end. Therefore, a request concerning engine performance characteristics such as driveability, emissions performance, and fuel consumption rate is reflected in the value of the parameter P11. In other words, the parameter P11 calculated by the highest level submodel 11 is a numerical value representing a request concerning engine performance.

The low-level submodels 12, 13 are characterized in that they can calculate parameter values even when an immediately higher-level submodel is not used. The low-level submodels 12, 13 are constructed so that they can calculate individual parameter values merely from the engine status amounts, as is the case with the highest level submodel 11. When, for instance, the submodel 12 is used, the submodel 13 uses the value of the parameter P12 as a target value and calculates the optimum solution for achieving the target value as the value of the parameter P13. When, on the other hand, the submodel 12 is not used, the submodel 13 calculates a preferred solution predictable from the engine status amounts as the value of the parameter P13.

As is obvious from the functions of the above-described submodels 11, 12, 13, the model 1 used in the control device has a variable model structure. More specifically, the model 1 can not only perform computation by using all submodels as shown in FIG. 1, but also perform computation by using one or more of them as shown in FIG. 2 or 3.

According to the model structure shown in FIG. 1, the model 1 begins its operation by allowing the highest level submodel 11 to calculate the value of the parameter P11 from the engine status amounts. Next, the model 1 allows the submodel 12 to use the value of the parameter P11 as a target value and calculate the value of the parameter P12 from the engine status amounts. The model 1 then allows the submodel 13 to use the value of the parameter P12 as a target value and calculate the value of the parameter P13 from the engine status amounts. When the above-described model structure is employed, the request concerning engine performance can be accurately reflected in the value of the final parameter P13. On the contrary, however, the use of the above-described model structure increases the computational load on the control device.

Figure 2:
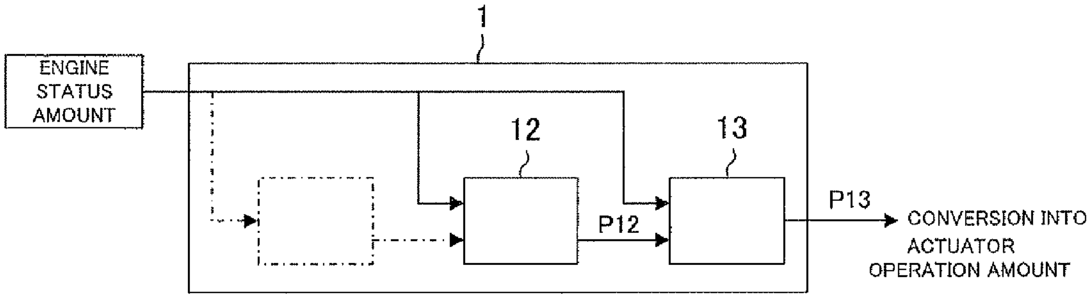
FIG. 2 is a diagram illustrating a model structure for the first embodiment of the present invention.

According to the model structure shown in FIG. 2, the model 1 uses the submodel 12 and the submodel 13. The model 1 begins its operation by allowing the submodel 12 to calculate the value of the parameter P12 from the engine status amounts. Next, the model 1 allows the submodel 13 to use the value of the parameter P12 as a target value and calculate the value of the parameter P13 from the engine status amounts. When the above-described model structure is employed, the computational load on the control device decreases although the accuracy of the model 1 decreases.

Figure 3:
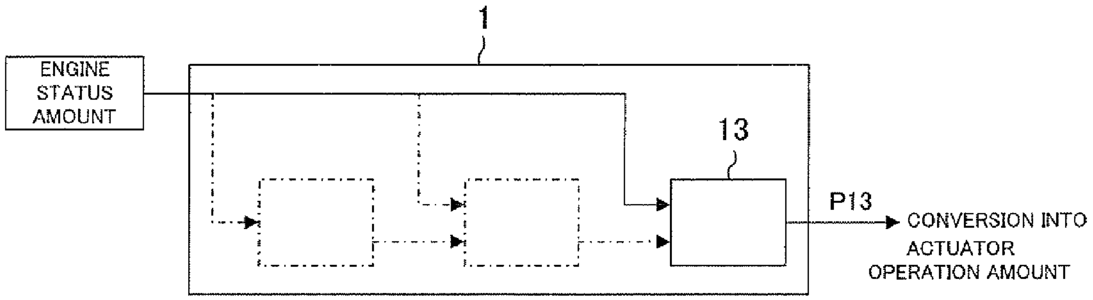
FIG. 3 is a diagram illustrating a model structure for the first embodiment of the present invention.

According to the model structure shown in FIG. 3, the model 1 uses the submodel 13 only, and allows the submodel 13 to calculate the value of the parameter P13 from the engine status amounts. When this model structure is employed, the computational load on the control device can be minimized.

As described above, the model 1 included in the control device makes it possible to arbitrarily adjust the balance between the accuracy of the model 1 and the computational load by changing the number of high-level submodels to be used in combination with the lowest level submodel 13. The control device selects such a combination of submodels in accordance with engine operation status such as the engine speed. The reason is that when the model 1 is used to perform computation at intervals of predetermined crank angles, the resulting computational load increases with an increase in the engine speed. More specifically, the control device applies the model structure shown in FIG. 1 to a low engine speed region, the model structure shown in FIG. 2 to a middle engine speed region, and the model structure shown in FIG. 3 to a high engine speed region. Changing the model structure in accordance with the engine speed as described above makes it possible to make the most of the computation capability of the control device.

The model used in the present embodiment has three hierarchical levels. However, a model having a larger number of hierarchical levels may alternatively be used. Increasing the number of hierarchical levels makes it possible to build a more accurate model. Conversely, a model having only two hierarchical levels (high and low) is acceptable. In the model used in the present embodiment, one submodel is set for one hierarchical level. However, a plurality of submodels may alternatively be set for one hierarchical level.

Figure 4:
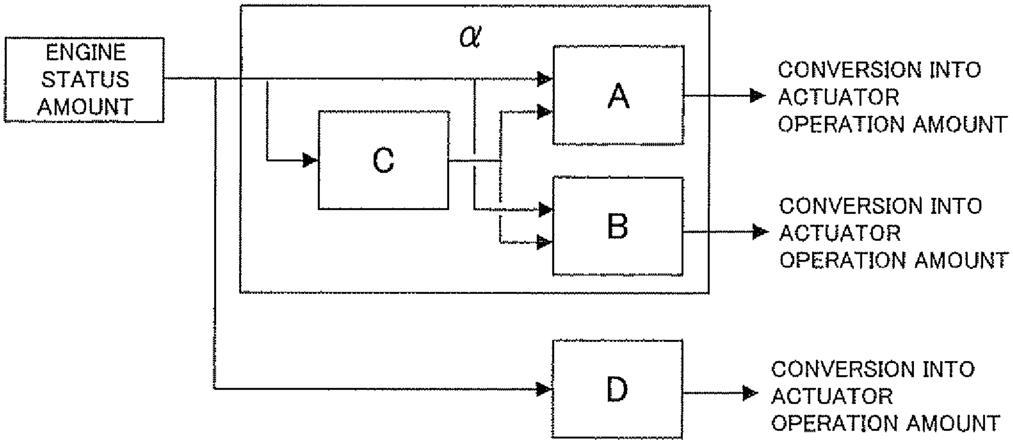
FIG. 4 is a diagram illustrating an application of a model structure for the first embodiment of the present invention.

FIG. 4 is a diagram illustrating an application based on the model structure shown in FIG. 1. In this application, two models are computed in parallel. One model is referred to as model α, which has a hierarchical structure and includes high-level submodel C and low-level submodels A and B. The other model is referred to as model D, which does not have a hierarchical structure. Parameters calculated by submodels A and B, which are the lowest level submodels of model α, and a parameter calculated by model D are respectively converted to different actuator operation amounts.

A method of selecting a model (submodel) combination will now be discussed with reference to the model structure shown in FIG. 4. The most favorable combination is a combination that fully utilizes the computation capability of the control device without exceeding it. It varies with the engine operation status, particularly, the engine speed. Therefore, the control device sets a load index value, which serves as a computational load index, for each model (submodel) and for each engine speed, and stores each setting in a memory. Further, when computing an actuator operation amount, the control device raises the hierarchical level of a high-level submodel to be used in combination with the lowest level submodel without allowing an integrated value of the load index value to exceed a reference value.

For example, assumed is a case where the following load index value settings are employed for various engine speeds:

| | Engine speed (rpm) | Load index value |
|---|---|---|
| Submodel A | [1000 2000 3000] | [10 20 30] |
| Submodel B | [1000 2000 3000] | [10 20 30] |
| Submodel C | [1000 2000 3000] | [40 40 50] |
| Model D | [1000 2000 3000] | [30 35 40] |

Here, it is assumed that the reference value (maximum permissible value) for the integrated value of the load index value is 100. In this case, when the engine speed is 1000 rpm, the computation capability is more than adequate. Therefore, in model α, submodel C can be used in combination with submodels A and B. It means that calculations based on submodels A, B, and C can be performed in parallel with calculations based on model D. When, on the other hand, the engine speed is 2000 rpm or 3000 rpm, there is no extra computation capability. Therefore, in model α, submodel C cannot be used in combination with submodels A and B. Consequently, in model α, calculations based only on submodels A and B are performed in parallel with the calculations based on model D. When the model structure for computation is determined in accordance with the load index value as described above, it is possible to always make the fullest possible use of the computation capability of the control device.

Figure 5:
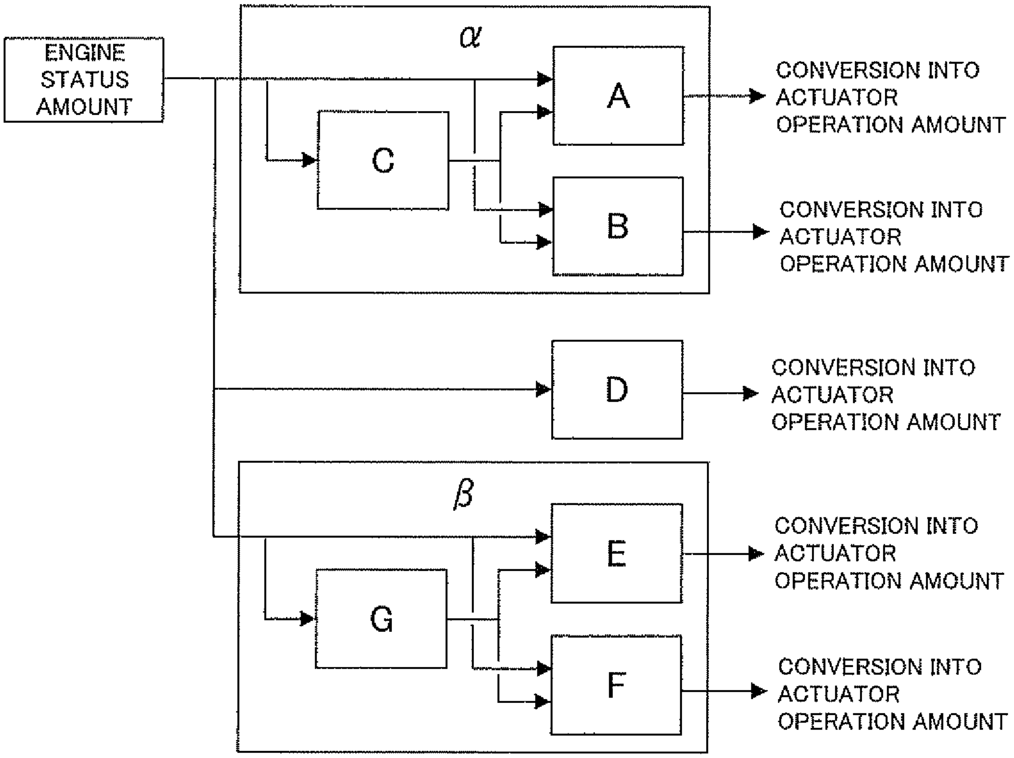
FIG. 5 is a diagram illustrating another application of a model structure for the first embodiment of the present invention.

FIG. 5 is a diagram illustrating another application based on the model structure shown in FIG. 1. In this application, three models are computed in parallel. The first model is referred to as model α, which has a hierarchical structure and includes high-level submodel C and low-level submodels A and B. The second model is referred to as model D, which does not have a hierarchical structure. The third model is referred to as model β, which has a hierarchical structure and includes high-level submodel G and low-level submodels E and F. Parameters calculated by submodels A and B, which are the lowest level submodels of model α, a parameter calculated by model D, and parameters calculated by submodels E and F, which are the lowest level submodels of model β, are respectively converted to different actuator operation amounts.

When a plurality of models having a hierarchical structure exist as shown in FIG. 5, various model (submodel) combinations can be selected within a range within which the integrated value of the load index value does not exceed the reference value. In this instance, the models having a hierarchical structure may be prioritized so as to combine high-level submodels with the lowest level submodel in order from the highest priority model to the lowest. If, for instance, model α is given the highest priority while model β is given the second highest priority, first of all, in model α, high-level submodel C is combined with submodels A and B, which are at the lowest level. Further, if the computation capability is still more than adequate, in model β, high-level submodel G is combined with submodels E and F, which are at the lowest level. This ensures that the computation capability of the control device is preferentially allocated to the computation of high priority models. Consequently, the computation capability of the control device can be effectively used.

In the example shown in FIG. 5, the priorities of models having a hierarchical structure can be varied in accordance with the engine operation status. If, for instance, emissions performance is given priority, the priority level of model a can be raised. If, on the other hand, fuel efficiency is given priority, the priority level of model β can be raised. This ensures that the computation capability of the control device is allocated to the computation of the currently highest priority model. Consequently, the computation capability of the control device can be more effectively used.

Second Embodiment

A second embodiment of the present invention will now be described with reference to the accompanying drawings.

Figure 6:
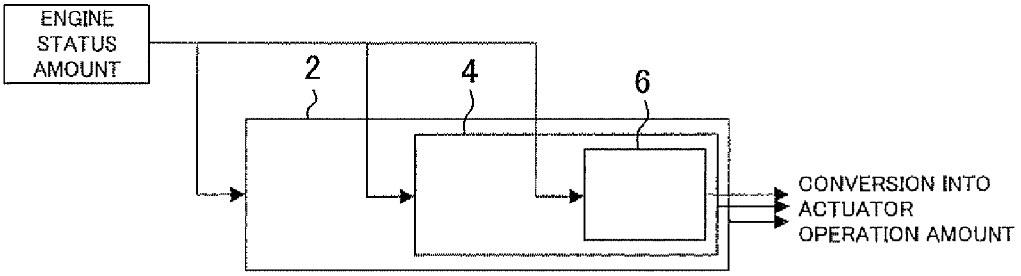
FIG. 6 is a diagram illustrating a model structure for a second embodiment of the present invention.

The second embodiment differs from the first embodiment in the model structure that the control device uses to compute the actuator operation amounts. FIG. 6 is a diagram illustrating a model structure for the second embodiment. As shown in FIG. 6, the control element of the control device has a model group, which includes a plurality of models 2, 4, 6 differing in scale. Various engine status amounts acquired by the sensors are input into each model 2, 4, 6. The input engine status amounts are used for parameter calculation in each model 2, 4, 6. The same parameters are calculated by each model. Each parameter is used to compute the same actuator operation amount.

Figure 7:
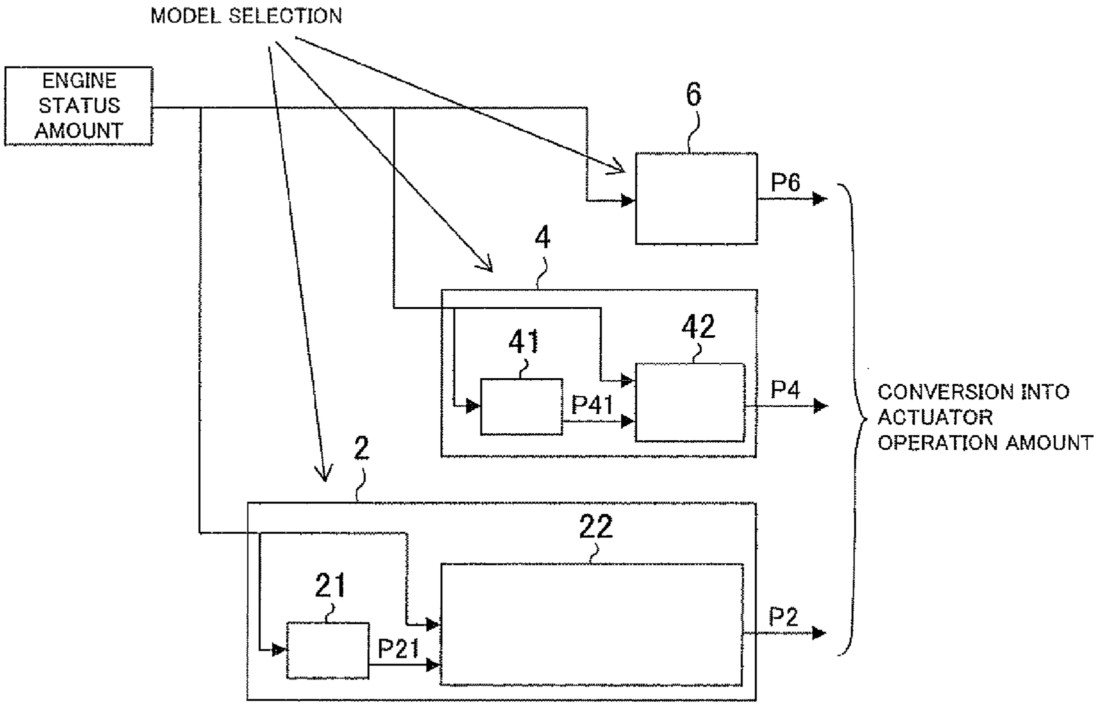
FIG. 7 is a diagram illustrating a model structure for the second embodiment of the present invention.

The difference in the scales of the models 2, 4, 6 represents the difference in accuracy. The largest-scale model 2 exhibits the highest accuracy. However, on the other side of the coin, the largest-scale model imposes the heaviest computational load on the control device. On the contrary, the smallest-scale model 6 imposes the lightest computational load on the control device although it exhibits a decreased accuracy. The models used in the present embodiment are configured so that a larger-scale model includes a smaller-scale model. More specifically, as regards two consecutive models arranged in a sequence, the larger-scale model includes a low-level submodel, which corresponds to a smaller-scale model, and a high-level submodel, which is coupled to the low-level submodel. FIG. 7 is an expanded view of the model structure shown in FIG. 6.

As shown in FIG. 7, the largest-scale model 2 is configured so that a low-level submodel 22, which corresponds to the medium-scale model 4, and a high-level submodel 21 are coupled together. Engine status amounts input into the model 2 are used for parameter calculation in each submodel. There is a means-end relation between a parameter P2 calculated by the low-level submodel 22 and a parameter P21 calculated by the high-level submodel 21. The high-level submodel 21 is built so as to calculate the value of the parameter P21 from the engine status amounts. A request concerning engine performance characteristics such as driveability, emissions performance, and fuel consumption rate is reflected in the value of the parameter P21. In other words, the parameter P21 calculated by the high-level submodel 21 is a numerical value representing a request concerning engine performance. The low-level submodel 22 is built so as to use the value of the parameter P21, which is calculated by the high-level submodel 21, as a target value, and calculate the value of the parameter P2 for achieving the target value from the engine status amounts.

The medium-scale model 4 is configured so that a low-level submodel 42, which corresponds to the smallest-scale model 6, and a high-level submodel 41 are coupled together. Engine status amounts input into the model 4 are used for parameter calculation in each submodel. There is a means-end relation between a parameter 24 calculated by the low-level submodel 42 and a parameter P41 calculated by the high-level submodel 41. The high-level submodel 41 is built so as to calculate the value of the parameter P41 from the engine status amounts. The low-level submodel 42 is built so as to use the value of the parameter P41, which is calculated by the high-level submodel 41, as a target value, and calculate the value of the parameter 24 for achieving the target value from the engine status amounts.

The smallest-scale model 6 is built so as to calculate the value of the parameter P6 from the engine status amounts only.

The parameters P2, P4, P6 calculated by the models 2, 4, 6 are the same parameters used to compute the same actuator operation amount. However, the values of these parameters do not always coincide with each other. The parameter P2 calculated by the model 2 is determined on the assumption that the parameter P21, which is a numerical value representing a request concerning engine performance, is used as a target. Therefore, the parameter 22 exhibits the highest accuracy from the viewpoint of meeting a request concerning engine performance. However, on the other side of the coin, the parameter P2 increases the computational load on the control device. On the other hand, the parameter P4 calculated by the model 4 is determined by using the parameter P41 as a target. However, the parameter P41 is not the optimum solution for achieving the parameter P21 but a preferred solution predictable from the engine status amounts. From the viewpoint of meeting a request concerning engine performance, therefore, the parameter P4 exhibits lower accuracy than the parameter P2, but reduces the computational load on the control device. The parameter P6 calculated by the model 6 is a preferred solution predictable from the engine status amounts only. Therefore, as regards the accuracy of meeting the request concerning engine performance, the parameter P6 is lower than the other parameters P2, P4. However, the parameter P6 minimizes the computational load on the control device.

As described above, the control device can arbitrarily adjust the balance between model accuracy and computational load by changing the scale of the model to be selected from the model group. The control device makes such a model selection in accordance with engine operation status such as the engine speed. The reason is that when a model is used to perform computation at intervals of predetermined crank angles, the resulting computational load increases with an increase in the engine speed. More specifically, the control device selects the model 2 for a low engine speed region, the model 4 for a middle engine speed region, and the model 6 for a high engine speed region. When the model to be selected is changed in accordance with the engine speed as described above, it is possible to make the most of the computation capability of the control device.

The model group used in the present embodiment includes three models. Alternatively, however, the model group may include a larger number of models differing in scale. Increasing the scale of a model increases the accuracy of the model. Conversely, the model group may alternatively include two models differing in scale. All models in the model group used in the present embodiment differ in scale. However, the model group may alternatively include a plurality of models having the same scale.

Figure 8:
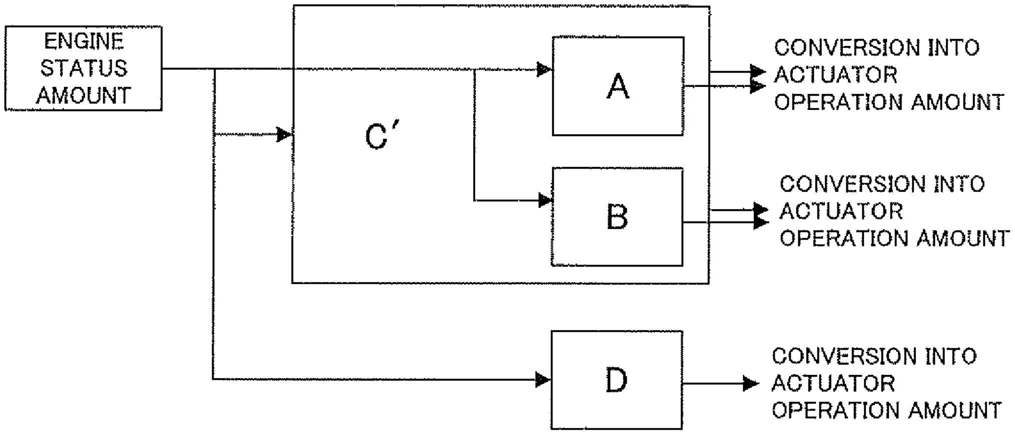
FIG. 8 is a diagram illustrating an application of a model structure for the second embodiment of the present invention.

FIG. 8 is a diagram illustrating an application based on the model structure shown in FIGS. 6 and 7. This application uses a model group that includes models A, B, and C'. Models A and B have the same scale and respectively calculate parameters used for the computation of different actuator operation amounts. Model C' is a larger-scale model that includes models A and B, and capable of calculating the aforementioned parameters with higher accuracy than models A and B. This application selects either the calculation based on models A and B or the calculation based on model C'. Model D is independent of the above-described model group. Model D performs calculations in parallel with a model selected from the above-described model group.

A model selection method will now be discussed with reference to the model structure shown in FIG. 8. The most favorable combination is a combination that fully utilizes the computation capability of the control device without exceeding it. It varies with the engine operation status, particularly, the engine speed. Therefore, the control device sets a load index value, which serves as a computational load index, for each model and for each engine speed, and stores each setting in a memory. Further, when computing an actuator operation amount, the control device enlarges the scale of the model to be selected without allowing an integrated value of the load index value to exceed a reference value.

For example, assumed is a case where the following load index value settings are employed for various engine speeds:

| | Engine speed (rpm) | Load index value |
|---|---|---|
| Model A | [1000 2000 3000] | [10 20 30] |
| Model B | [1000 2000 3000] | [10 20 30] |
| Model C' | [1000 2000 3000] | [60 80 100] |
| Model D | [1000 2000 3000] | [30 35 40] |

Here, it is assumed that the reference value (maximum permissible value) for the integrated value of the load index value is 100. In this case, when the engine speed is 1000 rpm, the computation capability is more than adequate. Therefore, model C' can be selected from the model group. It means that calculations based on model C' can be performed in parallel with calculations based on model D. When, on the other hand, the engine speed is 2000 rpm or 3000 rpm, there is no extra computation capability. Therefore, model C' cannot be selected from the model group. Consequently, models A and B are selected from the model group so that calculations based on models A and B are performed in parallel with the calculations based on model D. When the model selection for computation is determined in accordance with the load index value as described above, it is possible to always make the fullest possible use of the computation capability of the control device.

Figure 9:
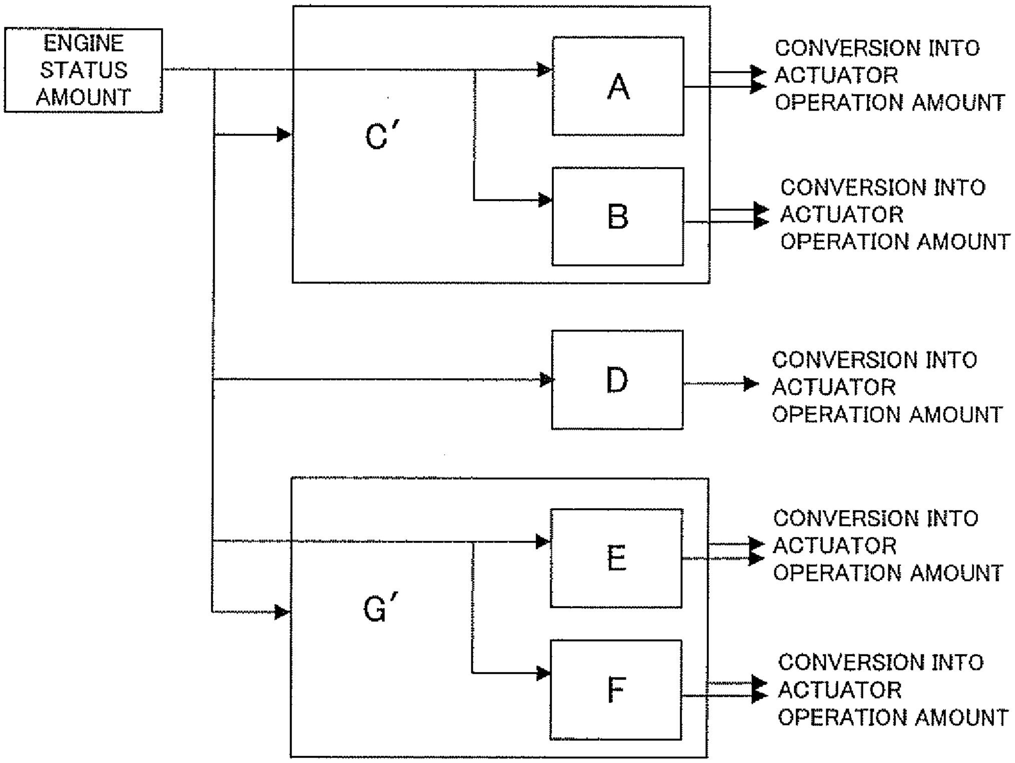
FIG. 9 is a diagram illustrating another application of a model structure for the second embodiment of the present invention.

FIG. 9 is a diagram illustrating another application based on the model structure shown in FIGS. 6 and 7. For this application, two model groups are prepared. One model group includes models A, B, and C'. The other model group includes models E, F, and G'. Model G' includes models E and F, has a larger scale than models E and F, and is capable of calculating a parameter with higher accuracy than models E and F. This application prioritizes the two model groups and enlarges the scale of the model to be used for the computation of actuator operation amounts, in order from the highest priority model to the lowest, within a range within which the load index value does not exceed the reference value. This ensures that the computation capability of the control device is preferentially allocated to the computation of a group of high priority models. Consequently, it is possible to make effective use of the computation capability of the control device.

In the example shown in FIG. 9, the priorities of the model groups can be varied in accordance with the engine operation status. If, for instance, emissions performance is given priority, the priority level of the model group including models A, B, and CT can be raised. If, on the other hand, fuel efficiency is given priority, the priority level of the model group including models E, F, and G' can be raised. This ensures that the computation capability of the control device is allocated to the computation of the currently highest priority model group. Consequently, the computation capability of the control device can be more effectively used.

Other

While the present invention has been described in terms of preferred embodiments, it should be understood that the present invention is not limited to those preferred embodiments. The present invention extends to various modifications that nevertheless fall within the scope and spirit of the present invention.

Figure 10:
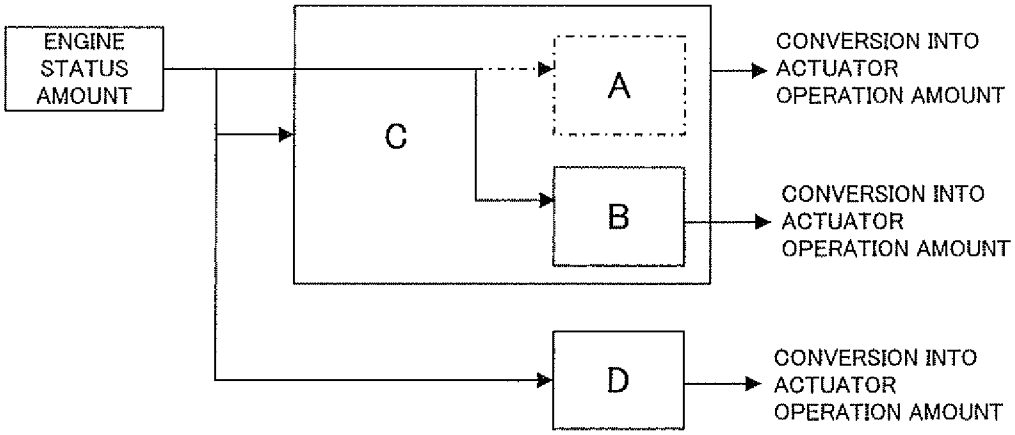
FIG. 10 is a diagram illustrating a modification of the model structure shown in FIG. 8.

For example, FIG. 10 is a diagram illustrating a modification of the model structure shown in FIG. 8. In this modification, calculations can be performed with models C' and B. More specifically, a model group including models A, B, and C' uses two parameters for actuator operation amount computation. One parameter is calculated with model B, which is small in scale, whereas the other parameter is calculated with model C', which is large in scale. An alternative is to calculate one parameter with model C' and calculate the other parameter with model A, which is small in scale. In this instance, the computation capability of the control device can be more effectively used when model C', which is large in scale, is allowed to calculate a parameter that needs to be highly accurate.

DESCRIPTION OF REFERENCE NUMERALS

| | |
|---|---|
| 1 | Model |
| 11 | Submodel (highest level) |
| 12 | Submodel (middle level) |
| 13 | Submodel (lowest level) |
| 2 | Model (large scale) |
| 4 | Model (middle scale) |
| 6 | Model (small scale) |
| 21, 41 | High-level submodel |
| 22, 42 | Low-level submodel |

The invention claimed is:

1. A control device for operating one or more actuators to control an operation of an internal combustion engine, the control device comprising:

a plurality of different sensors that acquire a plurality of different status amounts indicative of the status of the internal combustion engine (hereinafter referred to as the engine status amounts); and a computation element that computes an actuator operation amount from the engine status amounts, the computation element using a model during a process of the computation;

wherein the model includes a plurality of submodels arranged in a hierarchical sequence;

wherein, when parameters are calculated by two consecutive submodels arranged in the hierarchical sequence, there is a means-end relation between a parameter calculated by a lower-level submodel and a parameter calculated by a higher-level submodel;

wherein the highest level submodel calculates a parameter that is a numerical value representing a request concerning the performance of the internal combustion engine, and is built so as to calculate the parameter by using the engine status amounts;

wherein submodels other than the highest level submodel are built so that when an immediately higher-level submodel is used, a parameter calculated by the higher-level submodel is handled as a target value to calculate a parameter for achieving the target value from the engine status amounts, and that when the immediately higher-level submodel is not used, the parameter is calculated from the engine status amounts only; and wherein the computation element computes the actuator operation amount by using a parameter calculated by the lowest level submodel and changes the number of higher-level submodels to be used in combination with the lowest level submodel in accordance with the operation status of the internal combustion engine.

2. The control device according to claim 1, wherein the computation element stores a numerical value serving as a computational load index (hereinafter referred to as the load index value) for each submodel and for each operation state of the internal combustion engine, and raises the hierarchical level of a high-level submodel used in combination with the lowest level submodel within a range within which a reference value is not exceeded by an integrated value of the load index value.

3. The control device according to claim 2, wherein the computation element includes a plurality of differently structured models in order to respectively compute different actuator operation amounts; wherein the plurality of models are prioritized; and wherein the computation element raises the hierarchical level of the higher-level submodel to be used in combination with the lowest level submodel, in order from the highest priority model to the lowest, within a range within which the reference value is not exceeded by the integrated value of the load index value.

4. The control device according to claim 3, wherein the computation element changes the priorities of the plurality of models in accordance with the operation status of the internal combustion engine.

5. A control device for operating one or more actuators to control an operation of an internal combustion engine, the control device comprising:

a plurality of different sensors that acquire a plurality of different status amounts indicative of the status of the internal combustion engine (hereinafter referred to as the engine status amounts); and a computation element that computes an actuator operation amount from the engine status amounts, the computation element using a model during a process of the computation;

wherein the computation element has a model group, which includes a plurality of models differing in scale for computing the same actuator operation amount;

wherein the plurality of models are arranged in a sequence according to scale of computation executed by each model;

wherein the larger-scale one of two consecutive models arranged in the sequence includes a high-level submodel, which is located upstream in an information pathway, and a low-level submodel, which is located downstream in the information pathway and coupled to the high-level submodel;

wherein the smaller-scale one of two consecutive models arranged in the sequence corresponds to the low-level submodel which constitutes the larger-scale model;

wherein the low-level submodel is built so as to use a parameter calculated by the high-level submodel as a target value and calculate a parameter for achieving the target value from the engine status amounts;

wherein the high-level submodel is built so that when the high-level submodel constitutes the largest scale model, the high-level submodel calculates a parameter that is a numerical value representing a request concerning the performance of the internal combustion engine from the engine status amounts, and that when the high-level submodel constitutes a model other than the largest scale model, the high-level submodel predicts a parameter calculated by a high-level submodel of an immediate larger scale model from the engine status amounts and calculates a parameter for achieving the predicted parameter; and wherein the computation element selects a model for use in the computation of the actuator operation amount from the model group in accordance with the operation status of the internal combustion engine, and computes the actuator operation amount by using a parameter calculated by the selected model.

6. The control device according to claim 5, wherein the computation element has a model independent of the model group in order to compute another operation amount than the actuator operation amount; and wherein the computation element stores a numerical value serving as a computational load index (hereinafter referred to as the load index value) for each model and for each operation state of the internal combustion engine, and selects a model from the model group so that an integrated value of the load index value becomes maximized without exceeding a reference value.

7. The control device according to claim 5, wherein the computation element includes a plurality of model groups in order to respectively compute different actuator operation amounts; wherein the plurality of model groups are prioritized; and wherein the computation element stores a numerical value serving as a computational load index (hereinafter referred to as the load index value) for each model and for each operation state of the internal combustion engine, and enlarges the scale of the model to be used for the computation of the actuator operation amounts, in order from the highest priority model group to the lowest, within a range within which an integrated value of the load index value does not exceed the reference value.

8. The control device according to claim 7, wherein the computation element changes the priorities of the plurality of model groups in accordance with the operation status of the internal combustion engine.

* * * * *